(12) United States Patent
Danilak et al.

(10) Patent No.: US 8,595,394 B1
(45) Date of Patent: Nov. 26, 2013

(54) METHOD AND SYSTEM FOR DYNAMIC BUFFERING OF DISK I/O COMMAND CHAINS

(75) Inventors: Radoslav Danilak, Santa Clara, CA (US); Krishnaraj S. Rao, Sunnyvale, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 10/726,151

(22) Filed: Dec. 1, 2003

Related U.S. Application Data (60) Provisional application No. 60/483,401, filed on Jun. 26, 2003.

(51) Int. Cl.
*G06F 13/28* (2006.01)
*G06F 3/00* (2006.01)
*G06F 5/00* (2006.01)

(52) U.S. Cl.
USPC ............................................ 710/57; 710/26

(58) Field of Classification Search
USPC ........ 710/5, 29, 52–53, 57, 26; 711/100, 154; 3/57
See application file for complete search history.

(56) References Cited

U.S. PATENT DOCUMENTS

| | | | |
|---|---|---|---|
| 5,455,913 A * | 10/1995 | Shrock et al. ................. | 710/100 |
| 5,546,548 A | 8/1996 | Chen et al. | |
| 5,649,230 A * | 7/1997 | Lentz .............................. | 710/52 |
| 5,717,954 A * | 2/1998 | Grieff et al. ..................... | 710/57 |
| 5,761,468 A | 6/1998 | Emberson | |
| 5,768,548 A | 6/1998 | Young et al. | |
| 5,790,817 A | 8/1998 | Asghar et al. | |
| 5,822,568 A | 10/1998 | Swanstrom | |
| 5,864,876 A * | 1/1999 | Rossum et al. ............... | 711/206 |
| 5,881,248 A | 3/1999 | Mergard | |
| 5,923,859 A | 7/1999 | Melo et al. | |
| 5,940,866 A | 8/1999 | Chisholm et al. | |
| 5,968,143 A * | 10/1999 | Chisholm et al. ............... | 710/23 |
| 6,016,528 A | 1/2000 | Jaramillo et al. | |
| 6,018,803 A | 1/2000 | Kardach | |
| 6,029,223 A | 2/2000 | Klein | |
| 6,029,228 A | 2/2000 | Cai et al. | |
| 6,085,276 A | 7/2000 | VanDoren et al. | |
| 6,085,278 A | 7/2000 | Gates et al. | |
| 6,098,114 A | 8/2000 | McDonald et al. | |
| 6,101,568 A | 8/2000 | Richardson | |
| 6,157,980 A | 12/2000 | Arimilli et al. | |
| 6,175,634 B1 | 1/2001 | Graumann | |
| 6,182,112 B1 | 1/2001 | Malek et al. | |
| 6,185,634 B1 | 2/2001 | Wilcox | |

(Continued)

OTHER PUBLICATIONS

Brandt, Scott, "Module 2: Computer-System Structure" Spring 2001, http://www.soe.ucsc.edu/~sbrandt/courses/Spring01/111/slides/mod2.1.pdf.*

(Continued)

*Primary Examiner* — Chun-Kuan Lee (57) ABSTRACT

A method for dynamic buffering of disk I/O command chains for a computer system. The method includes receiving a plurality of disk I/O command chains from at least one thread executing on a processor of the computer system. A respective plurality of pointers for the disk I/O command chains are stored in a buffer of a disk controller. The disk I/O command chains are accessed for execution by the disk controller by serially accessing the pointers in the buffer.

8 Claims, 8 Drawing Sheets

(56) References Cited

U.S. PATENT DOCUMENTS

| | | |
|---|---|---|
| 6,205,524 B1 | 3/2001 | Ng |
| 6,226,695 B1 | 5/2001 | Kaiser et al. |
| 6,233,656 B1 | 5/2001 | Jones et al. |
| 6,266,742 B1 | 7/2001 | Challenger et al. |
| 6,298,407 B1 | 10/2001 | Davis et al. |
| 6,314,472 B1 | 11/2001 | Trieu et al. |
| 6,345,341 B1 | 2/2002 | Arimilli et al. |
| 6,397,296 B1 | 5/2002 | Werner |
| 6,418,496 B2 | 7/2002 | Pawlowski et al. |
| 6,442,634 B2 | 8/2002 | Bronson et al. |
| 6,480,939 B2 | 11/2002 | Anderson et al. |
| 6,526,518 B1 | 2/2003 | Catlin et al. |
| 6,560,657 B1 * | 5/2003 | Gandhi et al. .................... 710/5 |
| 6,571,318 B1 | 5/2003 | Sander et al. |
| 6,574,712 B1 | 6/2003 | Kahle et al. |
| 6,578,102 B1 | 6/2003 | Batchelor et al. |
| 6,631,434 B1 | 10/2003 | Johnson et al. |
| 6,681,281 B1 | 1/2004 | Maleck |
| 6,681,285 B1 | 1/2004 | Ng |
| 6,696,854 B2 | 2/2004 | Momtaz et al. |
| 6,696,954 B2 | 2/2004 | Chung |
| 6,745,258 B1 | 6/2004 | Pellegrino et al. |
| 6,751,038 B1 | 6/2004 | Wada |
| 6,754,755 B1 | 6/2004 | Johnson et al. |
| 6,782,457 B2 | 8/2004 | Hill et al. |
| 6,801,963 B2 | 10/2004 | Bissessur et al. |
| 6,842,803 B2 | 1/2005 | Schmidt et al. |
| 6,877,048 B2 * | 4/2005 | Bilak et al. .................... 710/52 |
| 6,898,649 B2 | 5/2005 | Goudie |
| 6,901,467 B2 | 5/2005 | Shah et al. |
| 6,904,473 B1 * | 6/2005 | Bloxham et al. ............ 710/22 |
| 6,907,480 B2 * | 6/2005 | Takei et al. .................... 710/52 |
| 6,910,106 B2 | 6/2005 | Sechrest et al. |
| 6,915,363 B2 | 7/2005 | Wood et al. |
| 6,950,892 B2 | 9/2005 | Bell, Jr. et al. |
| 6,957,290 B1 | 10/2005 | Rowlands et al. |
| 6,996,684 B2 | 2/2006 | Tseng et al. |
| 6,999,426 B2 | 2/2006 | Miyoshi |
| 7,032,046 B2 | 4/2006 | Horii et al. |
| 7,096,291 B2 | 8/2006 | Lin |
| 7,124,232 B2 | 10/2006 | Takeda et al. |
| 7,139,878 B2 | 11/2006 | Malik et al. |
| 7,143,219 B1 | 11/2006 | Chaudhari et al. |
| 7,177,985 B1 | 2/2007 | Diefendorff |
| 7,263,566 B2 | 8/2007 | Ganasan et al. |
| 7,376,846 B2 | 5/2008 | Hawkins et al. |
| 7,389,466 B1 | 6/2008 | Harmer et al. |
| 7,505,461 B2 | 3/2009 | Matsuda et al. |
| 7,525,986 B2 | 4/2009 | Lee et al. |
| 7,600,058 B1 | 10/2009 | Danilak |
| 7,706,756 B2 | 4/2010 | Sato et al. |
| 7,895,385 B2 | 2/2011 | Raju |
| 8,356,128 B2 | 1/2013 | Mittal |
| 8,356,142 B1 | 1/2013 | Danilak |
| 8,356,143 B1 | 1/2013 | Bulusu et al. |
| 8,370,552 B2 | 2/2013 | Mittal et al. |
| 2001/0001873 A1 | 5/2001 | Wickeraad et al. |
| 2001/0014928 A1 | 8/2001 | Chrysos et al. |
| 2002/0023204 A1 | 2/2002 | Barowski et al. |
| 2002/0056027 A1 | 5/2002 | Kanai et al. |
| 2002/0144054 A1 | 10/2002 | Fanning et al. |
| 2003/0126355 A1 | 7/2003 | David |
| 2003/0191880 A1 | 10/2003 | Lin |
| 2003/0229743 A1 | 12/2003 | Brown |
| 2003/0229762 A1 | 12/2003 | Maiyuran et al. |
| 2004/0024947 A1 | 2/2004 | Barth et al. |
| 2004/0024948 A1 | 2/2004 | Winkler et al. |
| 2004/0049641 A1 | 3/2004 | So et al. |
| 2004/0064649 A1 | 4/2004 | Volpe et al. |
| 2004/0083341 A1 | 4/2004 | Robinson et al. |
| 2004/0088458 A1 | 5/2004 | Tomlinson et al. |
| 2004/0117606 A1 | 6/2004 | Wang et al. |
| 2004/0123043 A1 | 6/2004 | Rotithor et al. |
| 2004/0201647 A1 | 10/2004 | Jackson Pulver et al. |
| 2005/0081014 A1 | 4/2005 | Tran et al. |
| 2005/0138254 A1 | 6/2005 | Raghavan et al. |
| 2005/0216607 A1 | 9/2005 | Munguia |
| 2006/0041721 A1 | 2/2006 | Hakura et al. |
| 2006/0041722 A1 | 2/2006 | Hakura et al. |
| 2006/0041723 A1 | 2/2006 | Hakura et al. |
| 2006/0095677 A1 | 5/2006 | Hakura et al. |
| 2007/0198758 A1 | 8/2007 | Asano et al. |
| 2009/0055566 A1 | 2/2009 | Reinig et al. |
| 2009/0089477 A1 | 4/2009 | Reed |
| 2009/0228631 A1 | 9/2009 | Marulkar et al. |
| 2010/0057973 A1 | 3/2010 | Barake et al. |

OTHER PUBLICATIONS

"Battery Charging Specification", USB Implementation Forum Inc., Dated: Mar. 8, 2007, pp. m1-29, Revision 1.0.

"Device Class Specification Adopters Agreement", Downloaded Circa: Mar. 10, 2007, pp. 1-5.

"Using Spin-Loops on Intel Pentium 4 Processor and Intel Xeon Processor". Version 2.1, May 2001. Order No. 248674-002. Retrieved from http://cache-www.intel.com/cd/00/00/01/76/17689_w_spinlock.pdf on Mar. 4, 2006.

Jason Fritts, "Multi-Level Memory Prefetching for Media and Stream Processing", Proceedings, 2002 IEEE International Conference on Multimedia and Expo, 2002. ICME '02. vol. 2, Aug. 26-29, 2002 pp. 101-104 vol. 2.

John Carter, et al., "Impulse: Building a Smarter Memory Controller". Proceedings, Fifth International Symposium on High-Performance Computer Architecture. Jan. 9-13, 1999 pp. 70-79.

Jouppi, N.P. "Improving direct-mapped cache performance by the addition of a small fully-associative cache and prefetch buffers", Proceedings. 17th Annual International Symposium on Computer Architecture, 1990. May 28-31, 1990 pp. 364-373.

* cited by examiner

METHOD AND SYSTEM FOR DYNAMIC BUFFERING OF DISK I/O COMMAND CHAINS

This application claims the benefit of commonly assigned U.S. Provisional Application "EFFICIENT I/O USING NDMA (ADMA)", Ser. No. 60/483,401, filed on Jun. 26, 2003, and which is incorporated herein in its entirety.

This application is related to the following commonly assigned U.S. Patent Applications: "A BYPASS METHOD FOR EFFICIENT DMA DISK I/O", by Danilak, R., Ser. No. 10/725,980, filed on Dec. 1, 2003, which is incorporated herein in its entirety; "A HARDWARE SUPPORT SYSTEM FOR ACCELERATED DISK I/O", by Danilak et al., Ser. No. 10/725,663, filed on Dec. 1, 2003, which is incorporated herein in its entirety; "A NOTIFIER METHOD FOR HANDLING DISK I/O COMMAND COMPLETION", by Danilak, R., Ser. No. 10/726,092, filed on Dec. 1, 2003, which is incorporated herein in its entirety; and "A METHOD AND SYSTEM FOR DYNAMIC APPENDING OF DISK I/O COMMAND CHAINS", by Danilak, R., Ser. No. 10/726,049, filed on Dec. 1, 2003, which is incorporated herein in its entirety.

FIELD OF THE INVENTION

The field of the present invention relates to digital computer systems. More particularly, the present invention relates computer system I/O methods.

BACKGROUND OF THE INVENTION

A primary factor in the utility of a computer system is its speed in executing application programs. A high-performance computer system is expected to be responsive to user inputs and to accurately provide processed results within real-time constraints. A primary factor in the speed and responsiveness of a computer system is the efficiency of its processor subsystem, memory subsystem, I/O (input output) subsystem, and the like. Large investments have been made in the development of very high-speed processors and high-speed memory subsystems. Consequently, the computer industry has seen remarkable annual improvements in computer system performance. A comparatively new area of focus for improving computer system performance is the input output mechanisms involved in accessing and storing data.

Data is typically stored on attached hard disk drives. Disk drives having a size of 200 GB or more are increasingly common in desktop and laptop computer systems. Fast and efficient access to data stored on such drives is important to responsiveness and functionality of typical user applications.

ATA (AT Attachment) is a widely supported specification that defines methods of accessing data on disks. The ATA specification evolved from the earlier IDE (integrated drive electronics) specification. ATA defines a type of hardware interface that is widely used to connect data storage peripheral devices such as hard disk drives, CD-ROMs, tape drives, and the like, to a computer system. The ATA standard has further evolved to accommodate additional device types and data transfer features. For example, ATAPI (ATA Packet Interface) defines a version of the ATA standard for CD-ROMs and tape drives, ATA-2 (Fast ATA) defines the faster transfer rates used in Enhanced IDE (EIDE), and ATA-3 adds interface improvements, including the ability to report potential problems.

ATA devices have shown dramatic increases in data transfer speed and storage capacity over time. However, computer systems using such faster devices have not fully shown the expected performance improvements. A number of interface problems with computer system I/O components are partially responsible for the performance limitations, such as, for example, the data transfer characteristics of the PCI bus (e.g., due to the need to retain host adapter PCI compatibility), the interrupt based data transfer mechanisms, and the like.

The ADMA (Automatic DMA) specification comprises a new specification designed to improve the performance of ATA type devices. ADMA is designed to add features that improve the data transfer speed and efficiency of ATA devices. For example, ADMA adds support for multi-threading applications, command chaining techniques, command queuing, and the like, which are intended to have the overall effect of decoupling the host command sequence from the channel execution. The objective of the ADMA standard is to dramatically increase the performance of computer systems that operate with ATA type devices.

One goal of the ADMA specification was to correct the inability of the prior art ATA specification to queue multiple I/O commands. In the ATA specification, an application can only have one I/O command (e.g., a disk I/O request) to an I/O driver (e.g., the software driver for a disk controller) outstanding at a given time. A subsequent disk I/O command can only be submitted once the previous disk I/O command completes. Hundreds of microseconds can elapse from the submission of the disk I/O request to the completion of the disk I/O request. If the application calls the I/O driver with the subsequent disk I/O request before it has completed the previous disk I/O request, the driver will reject the subsequent request, informing the application that it must wait until the previous request completes. The ADMA specification attempts to solve this problem by enabling a software application to submit multiple disk I/O requests to a driver and have multiple disk I/O requests outstanding.

Problems exist, however, with respect to how the prior art ADMA specification implements such multiple disk transactions. One such problem is the inability of multiple threads of an application, or of multiple applications, to append an existing command chain (e.g., a chain of multiple disk I/O requests). As described above, ADMA adds support for command chaining, command queuing, and the like. These techniques are designed to allow multiple I/O commands to be outstanding simultaneously. In other words, several commands outstanding at once, as opposed to issuing one command and waiting for it to complete before issuing the next command.

Unfortunately, once a chain of I/O commands has been established by a given application, the prior art ADMA specification makes it difficult to come back at a later time and add new command chains for execution. The prior art ADMA specification specifies a mechanism whereby command chains are added for execution by appending new commands to the previously specified command chain. For example, a chain of disk I/O commands generally comprises a chain of CPBs (command parameter blocks). The CPBs are data structures containing command sets that describe the disk transaction commands to be executed by the disk I/O engine. The CPBs are linked through a system of pointers, with each CPB have a pointer to the next CPB in the chain. Thus, a CPB chain is appended by altering the pointers in the last CPB of the chain to include the new CPBs. The coherency of the pointers must be maintained in order to ensure the reliable functioning of the disk I/O system.

The use of the prior art ADMA command chain appending schemes imposes a significant overhead burden on the computer system. The prior art ADMA specification relies upon a system of memory locks to maintain the coherency of the pointers of a CPB chain. The memory locks are implemented in order to ensure only one software process, or thread, can manipulate a CPB chain at a time. This can be very inefficient in a modern computer system having a modern, multi-threaded, multiprocess software execution environment. Each thread executing on the system must negotiate the memory locks in order to append the CPB chain. For example, a typical scenario requires one thread to unlock a command chain in order to gain access, append its new commands, lock the command chain, and have a second thread unlock the command chain, append its new commands, and re-lock the command chain. Thus, the prior art ADMA memory lock scheme adds a significant amount of overhead. The excessive overhead is especially problematic in the case of a modern multithreaded, multitasking computer system where, for example, many different threads may want to add disk I/O requests to a command queue for a disk drive.

The overhead problem of the prior art ADMA disk transaction methodology can significantly detract from overall computer system performance. As processor and system memory performance continue to show annual improvement, it becomes increasingly important that disk I/O systems show similar improvements. As latency penalties are reduced in other components of a computer system (e.g., data transfer buses, graphics operations, etc.) it becomes increasingly important that the disk I/O system shows similar degrees of improvement in order to avoid imposing performance bottlenecks on the overall computer system.

SUMMARY OF THE INVENTION

Thus, what is required is a solution that can significantly reduce overhead experienced by the computer system during disk I/O. The required solution should provide significantly reduced processor overhead in comparison to prior art appending mechanisms that append disk I/O command chains.

In one embodiment, the present invention is implemented as a method for dynamically buffering disk I/O command chains for a computer system. The method includes receiving a plurality of disk I/O command chains from one or more threads executing on a processor of the computer system. A respective plurality of pointers for the disk I/O command chains are stored in a buffer of a disk controller. The disk I/O command chains are accessed for execution by the disk controller by serially accessing the pointers in the buffer. In one embodiment, the pointers for the disk I/O command chains are stored in the buffer on FIFO (first in first-out) basis. The pointers enable the disk controller to dynamically access the first disk I/O command of each of the disk I/O command chains and execute the chains in accordance with the order of the pointers in the buffer.

In one embodiment, the disk controller receives the multiple disk I/O command chains by receiving respective pointers from re-entrant software code (e.g., of a disk I/O driver) executing on the computer system. In one embodiment, a CPU (central processor unit) lock function is used to load the buffer and an operating system lock function to handle the buffer after a buffer full condition occurs.

In this manner, embodiments of the present invention allow multiple threads of a modern multithreaded, multitasking computer system to dynamically generate disk I/O command chains for execution by the disk controller. Dynamically accessing the disk I/O command chains using the pointer buffer eliminates the appending of disk I/O chains as required by the prior art, thereby eliminating the cumbersome, CPU intensive, command chain locking scheme, as required by the prior art. There are no disk I/O command chain coherency problems since chain concatenation is not required.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments of the present invention comprise a method and system for dynamically buffering disk I/O command chains of a computer system. Embodiments of the present invention significantly reduce overhead experienced by the computer system during disk I/O. Additionally, embodiments of the present invention significantly reduce processor overhead in comparison to prior art appending mechanisms that append disk I/O command chains.

Figure 1:
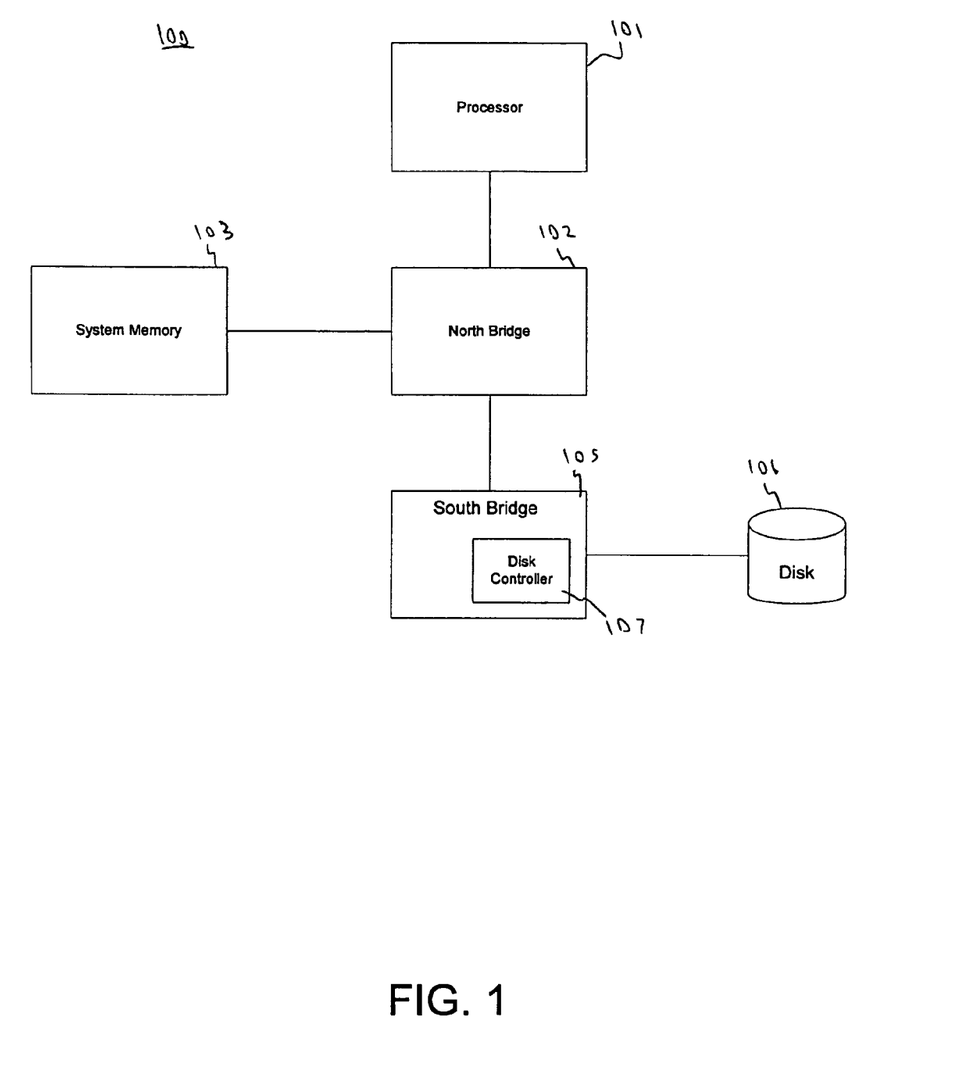
FIG. 1 shows a diagram depicting a computer system showing the basic components of a computer system platform that may be used to implement the functionality of embodiments of the present invention.

FIG. 1 shows a diagram depicting a computer system 100 showing the basic components of a computer system platform that may be used to implement the functionality of an embodiment of the present invention. The system 100 embodiment of FIG. 1 shows a general-purpose processor 101 (e.g., a CPU) coupled to system memory 103 via a memory controller 102 (e.g., North bridge). System 100 also shows a South bridge 105 coupled to a disk drive 106. In this embodiment, the South bridge 105 includes a disk controller 107 for controlling the disk drive 106.

Figure 8:
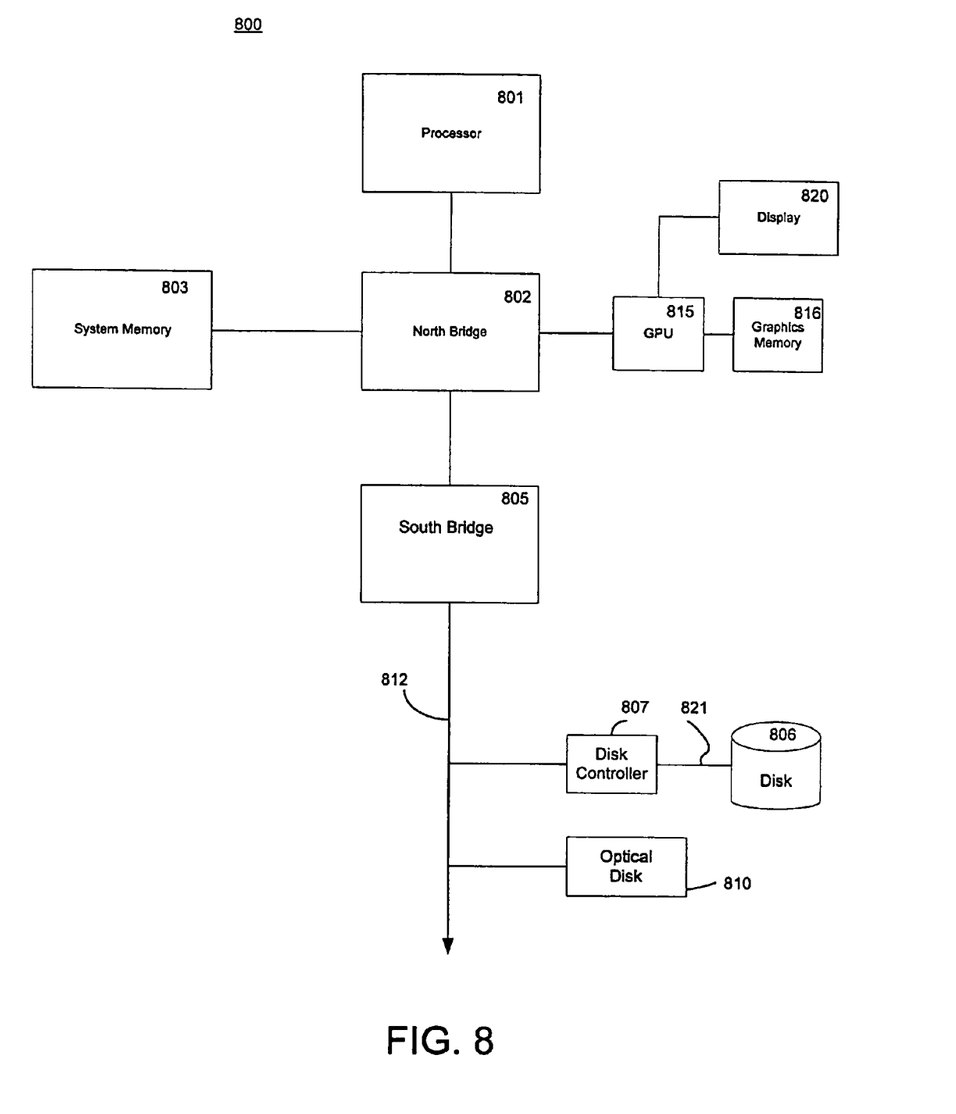
FIG. 8 shows a diagram of a computer system in accordance with an alternative embodiment of the present invention.

It should be noted that the computer system 100 embodiment shows one configuration of a computer system platform that can implement the functionality of the present invention. The specific configuration of a computer system in accordance with the present invention can change in accordance with specific requirements of a given application. For example, components can be included that add specialized peripheral buses (e.g., 1394, USB, etc.), network connectivity (e.g., Ethernet, Bluetooth, etc.), specialized graphics functions and graphics memory (e.g., high-performance graphics processor units, local graphics memory, etc.), I/O devices (e.g., keyboards, mice, etc.), and the like. Although the system 100 embodiment shows two bridge components (e.g., North bridge 102 and South bridge 105), system 100 can be implemented with a single bridge component, for example where the North bridge 102 and the South bridge 105 are combined. Similarly, the disk controller 107 can be a discrete component coupled to the South bridge 105 via a bus (e.g., as opposed to being integrated). An example of such an embodiment is shown in FIG. 8 below.

Accordingly, computer system 100 can function as the basic computer system platform for a laptop, desktop, or server computer system, or for a set-top gaming device such as, for example, an X-Box™ or similar gaming device or console. Additionally, it should be noted that the term CPU is used herein generally, and thus can be implemented as a number of different types of processors for a number of different types of computer system devices, such as, for example, an embedded processor, a graphics processor (e.g., specialized for performing graphics computations), a multi-processor subsystem, and the like.

Figure 2:
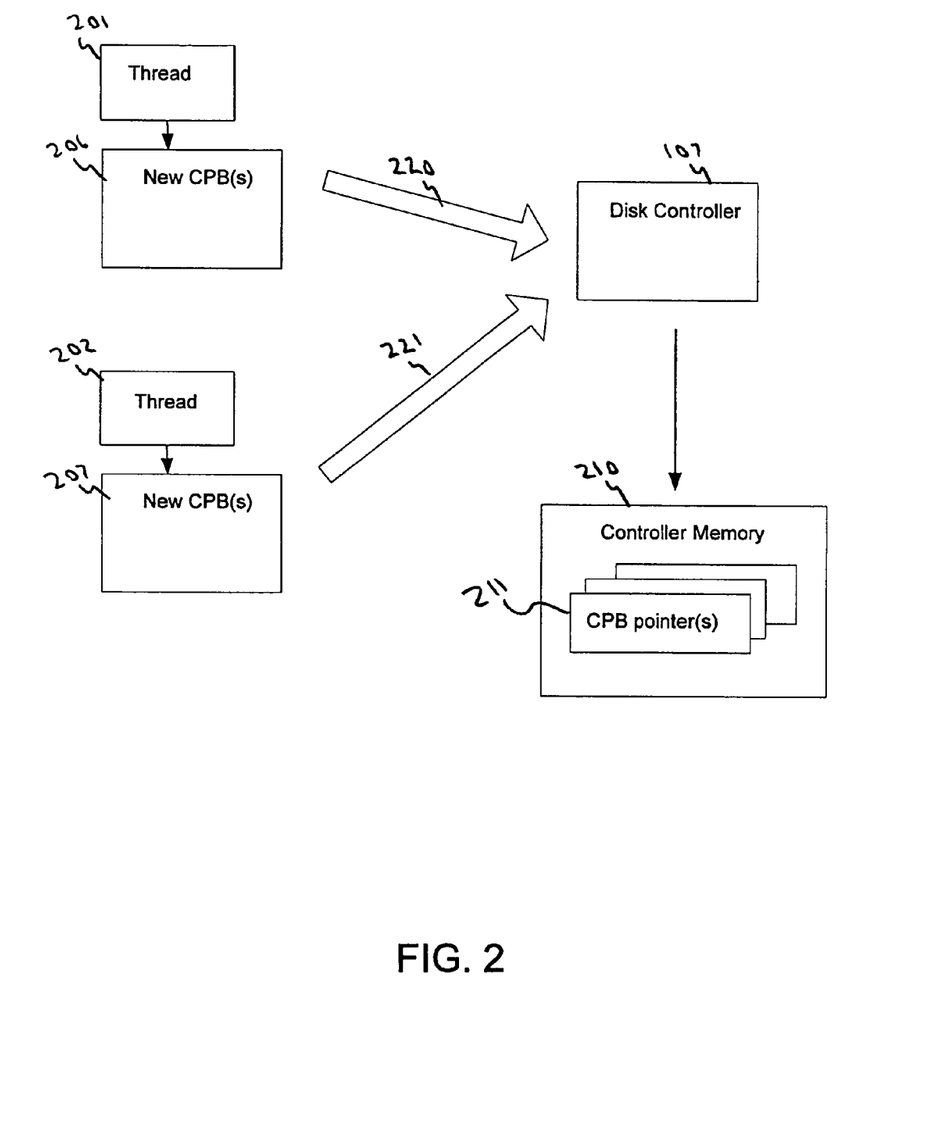
FIG. 2 shows a diagram depicting the operation of a disk controller with first and second threads in accordance with one embodiment of the present invention.

FIG. 2 shows a diagram depicting the operation of the disk controller 107 with first and second threads 201-202 (e.g., executing on the CPU 101) in accordance with one embodiment of the present invention. The disk controller 107 embodiment functions by implementing a method for dynamically buffering disk I/O command chains of a computer system.

The threads 201-202 each generate a disk I/O command chain, illustrated as the new CPBs 206 and 207. As known by those skilled in the art, a thread can specify multiple disk I/O commands by arranging the commands within a chain data structure. When a thread wants to execute new disk I/O commands, it generates new disk I/O command chains. These chains comprise at least one CPB, and are typically two or more CPBs. This is shown in FIG. 2 as the new CPB(s) 206 and 207. The CPB(s) 206-207 each generally comprise a chain of CPBs (command parameter blocks) that contain command sets that describe the disk transaction commands to be executed by the disk I/O engine (e.g., within the disk controller 107). The CPBs of the CPB chains 206-207 are respectively linked through a system of pointers, with each CPB having a pointer to the next CPB in the chain.

In the present embodiment, the threads 201-202 are able to generate and specify their respective new CPB chains 206-207 for execution by the disk controller 107 without invoking any append commands, implementing any append operations, or the like. In the present embodiment, the disk controller 107 implements this functionality by dynamically buffering disk I/O command chains 206-207.

Referring still to FIG. 2, the threads 201-202 are typically software threads from a disk driver executing on the processor 101. Generally, the threads 201-202 are invoked by applications as the applications request some form of disk I/O (e.g., read data from the disk drive 106, write data to the disk drive 106, etc.). As shown in FIG. 2, the threads create new CPBs 206-207 that describe the requested disk I/O commands.

The threads 201-202 pass their new CPB chains 206-207 to the disk controller 107 by passing respective pointers to the respective first CPB of the CPB chains 206-207. This is depicted by the arrows 220-221. For example, thread 201 transfers a pointer to the first CPB of the new CPB chain 206 to the disk controller 107. Similarly, thread 202 transfers a pointer to the first CPB of the new CPB chain 207.

The disk controller 107 receives the pointers and stores the pointers for the disk I/O command chains in a controller memory 210. In one embodiment, the controller memory 210 implements a buffer for storing (e.g., in a FIFO) the CPB pointers (e.g., CPB pointers 211). The disk I/O command chains (CPB chains 206-207) are accessed for execution by the disk controller 107 by serially accessing the pointers in the controller memory.

For example, the pointers for the disk I/O command chains can be stored in a buffer data structure of the controller memory 210 on FIFO (first in first-out) basis. The disk controller 107 accesses one pointer, retrieves the corresponding CPB chain from system memory (e.g., system memory 103), executes the specified disk I/O commands, accesses the next pointer, retrieves the next pointer's corresponding CPB chain, executes the specified disk I/O commands, and so on. Thus, the CPB pointers 211 enable the disk controller 107 to dynamically access the first disk I/O command of each of the disk I/O command chains and execute the chains in accordance with the order of the pointers in the buffer data structure.

In this manner, embodiments of the present invention allow multiple threads (e.g., threads 201-202) of a modern multi-threaded, multitasking computer system to dynamically generate disk I/O command chains for execution by the disk controller (e.g., disk controller 107). Embodiments of the present invention dynamically access the disk I/O command chains by using queued pointers from controller memory (e.g., controller memory 210). This attribute eliminates the appending of disk I/O chains, thereby eliminating the cumbersome, CPU intensive, command chain locking scheme, as required by the prior art. There are no disk I/O command chain coherency problems since chain concatenation is not required.

The new CPB chains 206-207 can be issued contemporaneously by their respective threads 201-202. In other words, multiple disk I/O command chains (e.g., multiple CPB chains) can be outstanding at a given time. The multiple outstanding disk I/O command chains are executed asynchronously by the disk controller 107 with respect to the threads executing on the processor 101. No appending of any CPB pointers is required.

Thus, the entire prior art scheme (e.g., of the ADMA specification) of memory locks and the like for protecting the coherency of the pointers of the CPB chain 206 or the CPB chain 207 can be eliminated. For example, in the present embodiment, the entire prior art burden for maintaining pointer coherency during an append operation is eliminated. The threads 201-202 add their CPBs 206-207 by transferring the pointers to their respective chains to the disk controller 107. There is no requirement to avoid breaking any existing, or prior, CPB chain as the new CPB chains are added.

Figure 3:
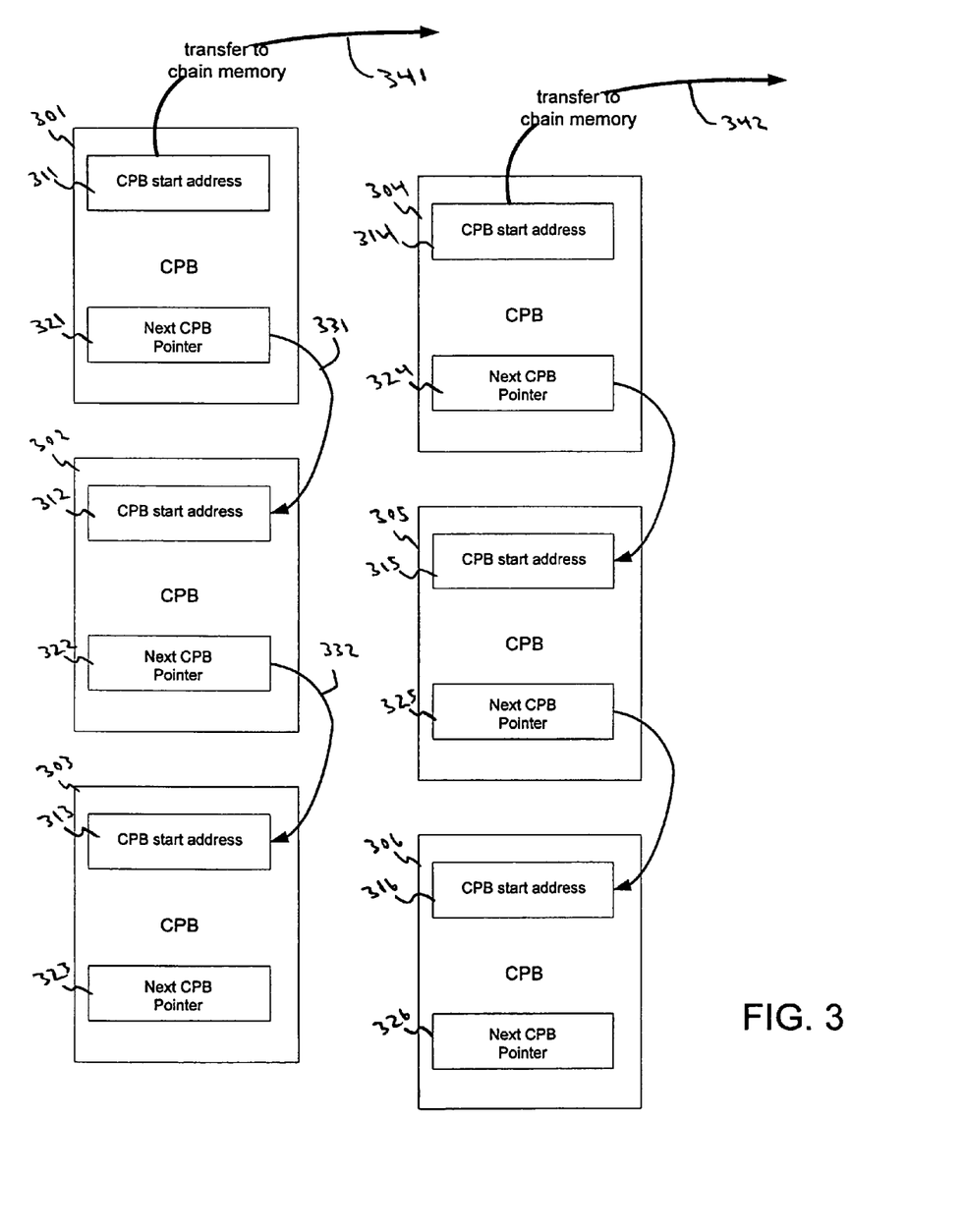
FIG. 3 shows a diagram depicting three CPBs of a first CPB chain and three CPBs of a second CPB chain in accordance with one embodiment of the present invention.

FIG. 3 shows a diagram depicting three CPBs 301-303 of a first CPB chain (e.g., CPB chain 206) and three CPBs 304-306 of a second CPB chain (e.g., CPB chain 207) in accordance with one embodiment of the present invention.

As described above, the CPBs of a CPB chain are linked through respective CPB pointers from one CPB to the next CPB in the chain. This is shown in FIG. 3 as the CPBs 301-303 each having respective CPB start addresses 311-313 and respective next CPB pointers 321-323. Similarly, the CPBs 304-306 each have respective CPB start addresses 314-316 and respective next CPB pointers 324-326. For example, as shown by the arrows 331-332, in the CPB 301, the next CPB pointer 321 points to the CPB start address 312 of the CPB 302, and the next CPB pointer 322 points to the CPB start address 313 of the CPB 303.

In the present embodiment, the first chain (e.g., CPBs 301-303) and the second chain (e.g., CPBs 304-306) are prepared for execution by transferring their respective CPB start addresses 311 and 314 to chain memory, for example, the controller memory 210 of the disk controller 107, for execution by the disk controller 107 in the manner described above. This is shown in FIG. 3 by the arrows 341 and 342.

Figure 4:
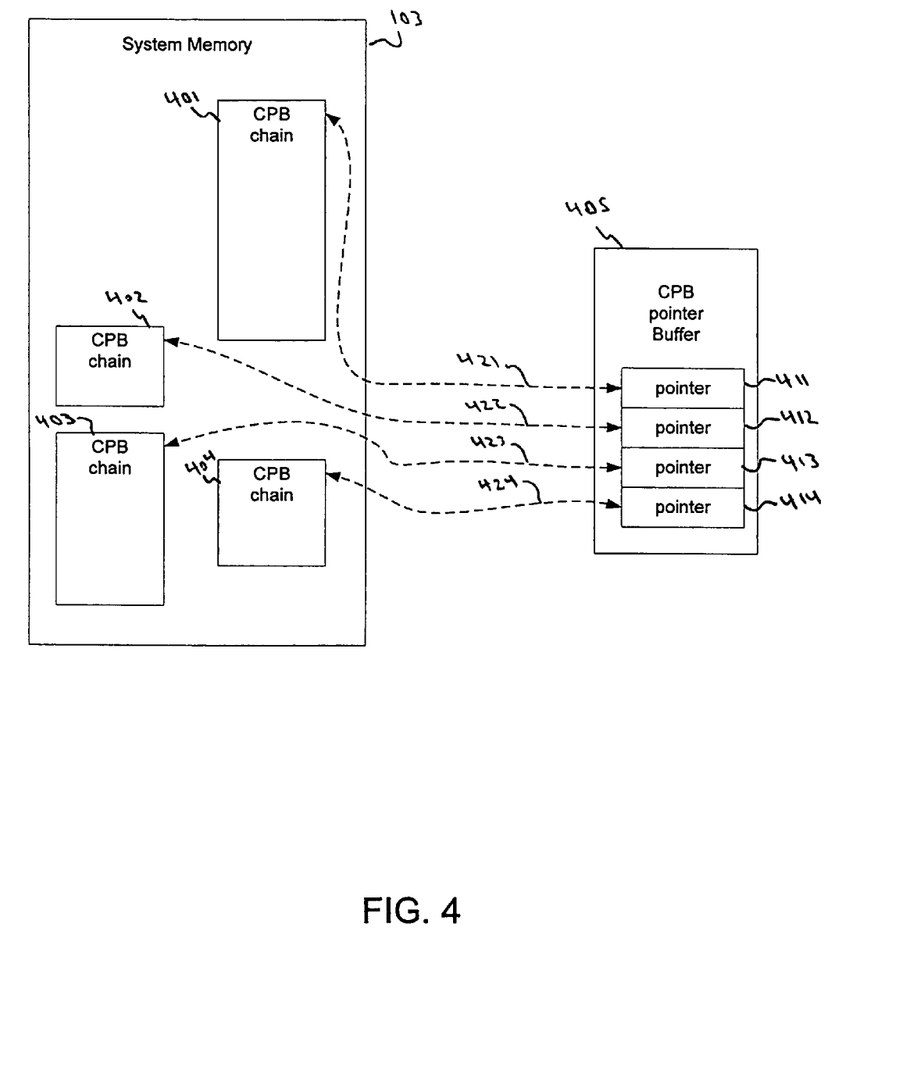
FIG. 4 shows a diagram depicting the system memory having a plurality of CPB chains and their respective pointers within a CPB pointer buffer in accordance with one embodiment of the present invention.

FIG. 4 shows a diagram depicting the system memory 103 having a plurality of CPB chains 401-404 and their respective pointers 411-414 within a CPB pointer buffer 405 in accordance with one embodiment of the present invention.

In the FIG. 4 embodiment, the actual CPB data structures 401-404 remain within system memory 103. The disk controller 107 uses the pointers 411-414 (e.g., the start addresses) of the CPB chains 401-404 to retrieve them from the system memory 103 (e.g., via DMA transfer) and execute them. This is shown in FIG. 4 by the lines 421-424.

The CPB pointer buffer 405 functions by storing the pointers 411-414 received from, for example, multiple disk I/O driver threads. In the present embodiment, the buffer 405 stores the pointers on a FIFO (first-in first-out) basis. For example, the order in which the pointers are stored in the buffer 405 determines the order in which the CPBs 401-404 will be retrieved from the system memory 103 and executed. Thus, even though the multiple threads may contemporaneously add respective pointers for execution by the disk controller, the disk controller will use the pointers 411-414 in the buffer 405 to serially execute the respective CPBs 401-404. This execution occurs asynchronously with respect to the execution of the multiple threads.

Referring still to FIG. 4, in one embodiment, a CPU (central processor unit) lock function is used to load the buffer 405 and an operating system lock function is used to handle the buffer 405 after a buffer full condition occurs. As used herein, the term "CPU lock function" refers to the hardware support provided by a CPU when adding objects (e.g., pointers) to a FIFO. As known by those skilled in the art, the use of the CPU lock function allows the hardware functionality of the CPU (e.g., processor 101 of FIG. 1) to check for a FIFO buffer full condition prior to adding new objects (e.g., pointers) to the FIFO (e.g., to prevent buffer overflow).

The hardware functionality of the CPU lock function renders this method much faster than the corresponding operating system lock function. As used herein, the term "operating system lock function" refers to the software based support provided by an operating system when adding objects to a FIFO. As known by those skilled in the art, the use of the operating system lock function requires the invocation of at least one software routine and involves the execution of a hundred lines of software code, or more. Thus the operating system lock function is much slower. The software routine functions by checking for a FIFO buffer full condition prior to adding new objects to the FIFO.

The operating system lock function provides an advantage wherein, in case of a FIFO buffer full condition, the software code for handling the FIFO buffer full condition is able to run immediately. For example, in a case where the CPB pointer buffer 405 is full, subsequent pointers can be stored in system memory 103 and added to the CPB pointer buffer 405 at a later time (e.g., after one or more of the pointers stored in the pointer buffer 405 have been processed and drained).

The use of the CPU lock function prior to a FIFO buffer full condition and the use of the operating system lock function after the occurrence of a FIFO buffer full condition enable embodiments of the present invention to efficiently support large numbers of outstanding disk I/O commands. For example, instead of the upper limit to the number of outstanding disk I/O commands being determined by the physical size of the CPB pointer buffer 405, embodiments of the present invention are able to support an unbounded upper limit (e.g., after the buffer is full) by using the OS to queue outstanding disk I/O commands (e.g., in system memory 103) until space is available within the CPB pointer buffer 405. This attribute is important since many applications (e.g., disk array subsystems, network-attached storage systems, and the like) can have a very large number of outstanding disk I/O commands.

Figure 5:
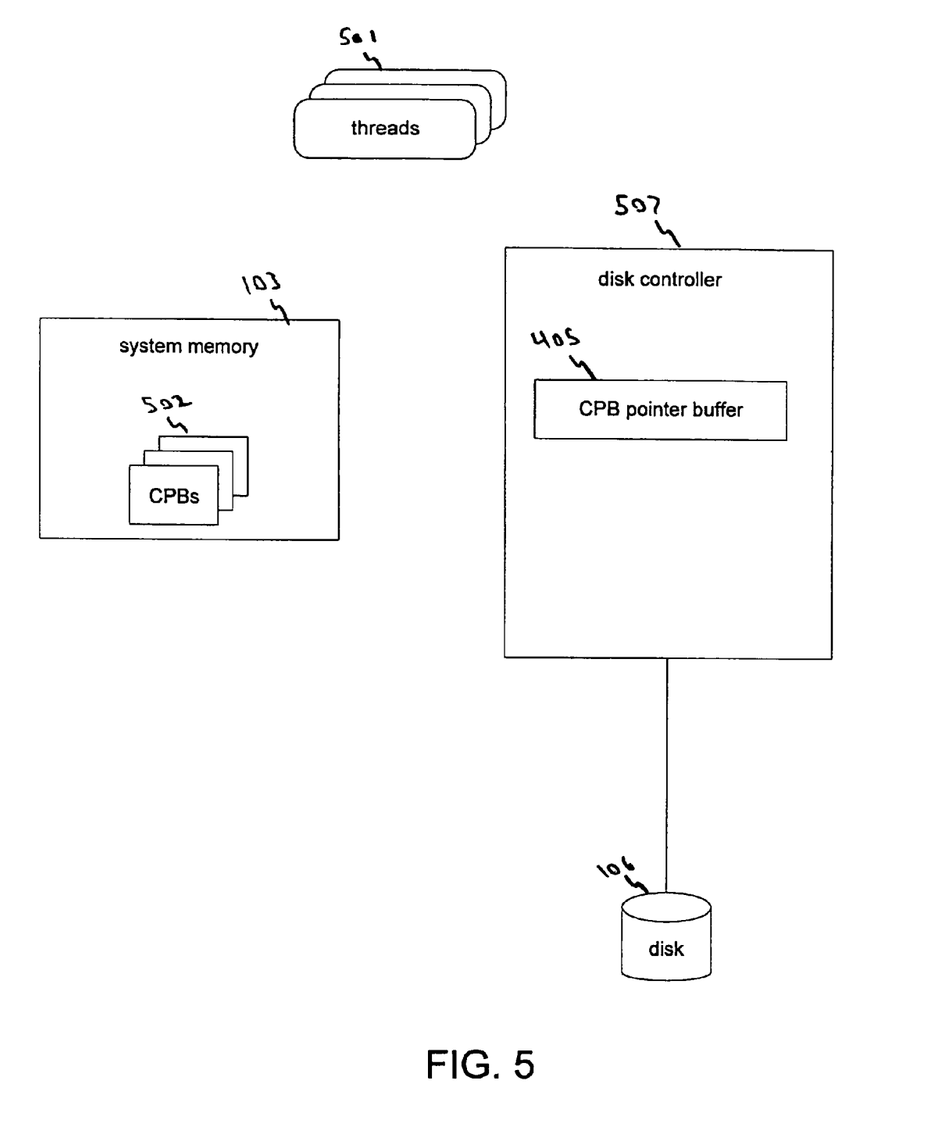
FIG. 5 shows a diagram of the disk controller having a CPB pointer buffer in accordance with one embodiment of the present invention.

FIG. 5 shows a diagram of the disk controller 507 in accordance with one embodiment of the present invention. In this embodiment, the CPB chains 502 are stored within system memory 103 and their respective pointers are stored within the CPB pointer buffer 405. FIG. 5 shows the multiple threads 501 (e.g., executing on the processor 101) that generate the CPB chains 502.

Figure 6:
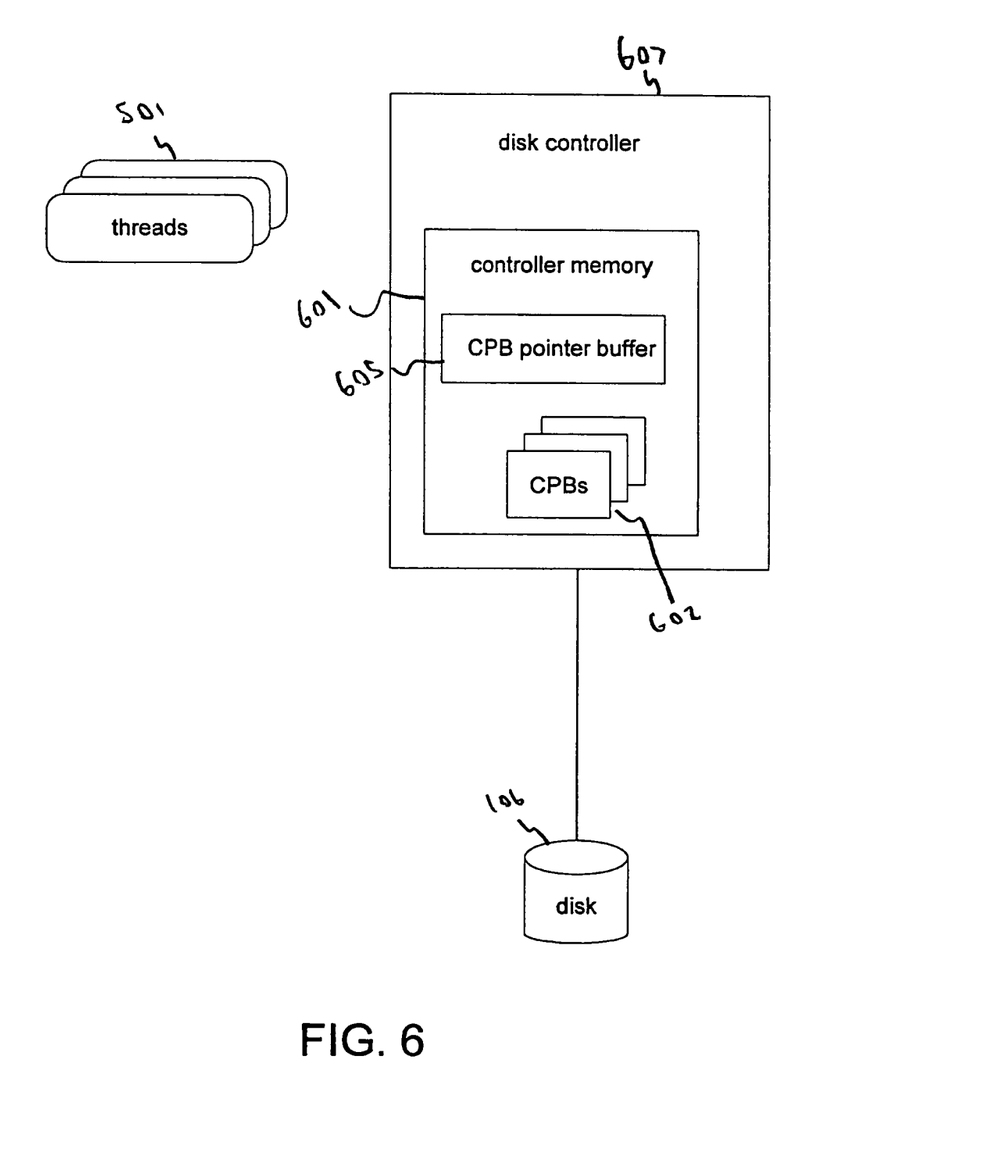
FIG. 6 shows a diagram a disk controller having an internal controller memory with a pointer buffer data structure in accordance with an alternative embodiment of the present invention.

FIG. 6 shows a diagram a disk controller 607 in accordance with an alternative embodiment of the present invention. In the disk controller 607 embodiment, the pointer buffer 605 is implemented as a data structure within an internal controller memory 601 (e.g., and on-chip RAM). Similarly, in this embodiment, the CPBs 602 are stored within the controller memory 601. The controller 607 embodiment provides the advantage of reducing DMA transfers between system memory and the disk controller. Instead of pulling the CPBs from system memory, the disk controller 607 maintains the CPBs directly within its memory 601. For example, the threads 501 push both the CPB pointers and the CPB data structures themselves to the disk controller 607. As with the disk controller 507 embodiment of FIG. 5, the CPB pointer buffer 605 stores pointers to the CPBs created by the threads 501. However, as opposed to being a discrete buffer (e.g., the CPB pointer buffer 505 of FIG. 5), the buffer 605 is implemented as a data structure within the controller memory 601.

Figure 7:
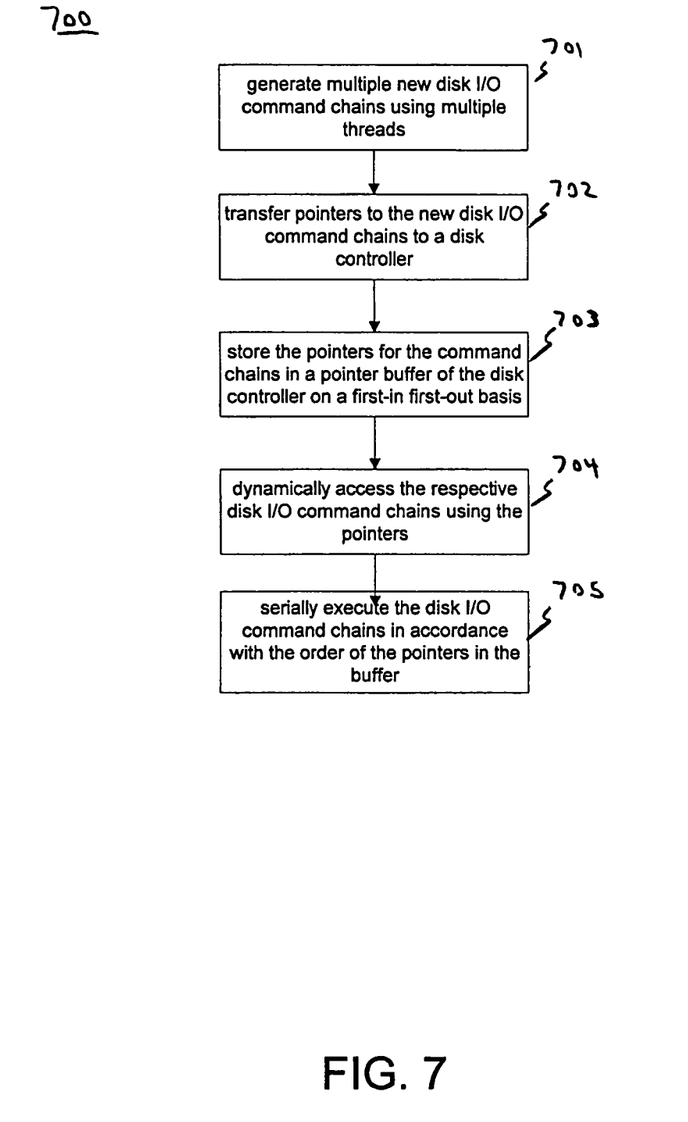
FIG. 7 shows a flowchart of the steps of a dynamic disk I/O command chain buffering process in accordance with one embodiment of the present invention.

FIG. 7 shows a flowchart of the steps of a process 700 in accordance with one embodiment of the present invention. As depicted in FIG. 7, process 700 shows the general steps involved in a dynamic disk I/O command chain buffering process as implemented by a computer system in accordance with one embodiment of the present invention (e.g., system 100 of FIG. 1).

Process 700 begins in step 701, where multiple threads executing on the computer system generate multiple new disk I/O command chains. As described above, the multiple threads can result from different applications requesting disk I/O. For example, as each application requests a disk I/O, re-entrant disk I/O driver software can spawn multiple threads to implement the I/O commands. In step 702, the threads transfer pointers to the new disk I/O commands to a disk controller coupled to the computer system. As described above, the pointers can be a start address for the first CPB of a chain of CPBs. The CPB chains are created in system memory by the threads. The threads push the pointers to the disk controller.

In step 703, the pointers are stored in a pointer buffer (e.g., CPB pointer buffer 405 of FIG. 5) of the disk controller on a FIFO basis. In step 704, the disk controller then dynamically accesses the respective disk I/O command chains by using the pointers. In one embodiment, the disk controller performs a DMA access to system memory, for example, using the pointers to find the respective CPB chains. In another embodiment, the respective CPBs are stored within an on-chip RAM (e.g., controller memory 601 of FIG. 6) of the disk controller and are directly accessed therefrom. In step 705, the retrieved disk I/O command chains are serially executed by the disk controller in accordance with the order of the pointers in the buffer. As described above, the execution of the command chains occurs asynchronously with respect to the threads executing on the processor of the computer system.

In this manner, embodiments of the present invention allow multiple threads of a modern multithreaded, multitasking computer system to dynamically issue multiple disk I/O command chains while eliminating overhead associated with command chain appending mechanisms. Multiple disk I/O command chains can be issued and be outstanding without incurring any overhead from cumbersome, CPU intensive, command chain appending and command chain locking schemes, as required by the prior art.

FIG. 8 shows a diagram of a computer system 800 in accordance with an alternative embodiment of the present invention. Computer system 800 is substantially similar to computer system 100 of FIG. 1. Computer system 800 shows a discrete GPU 815 (graphics processor unit) and a discrete disk controller 807. The computer system 800 includes a general-purpose CPU 801 coupled to a system memory 803 via a memory controller 802 (e.g., North bridge). In this embodiment, a South bridge 805 is coupled to a discrete disk drive controller 807 and an optical disk 810 (e.g., DVD ROM, CD ROM, etc.) via a bus 812. The disk controller 807 is coupled to a hard disk drive 806. The system 800 embodiment also includes a GPU 815 coupled to drive a display 820. The GPU 815 is coupled to its local graphics memory 816.

In one embodiment, the disk drive 806 is in accordance with a version of the ATA specification. For example, the disk drive 806 can be a Serial ATA (e.g., SATA) disk drive and the bus 821 can be a Serial ATA bus. Alternatively, the disk drive 806 can be an ATA disk drive coupled to the disk controller 807 via an ATA 100 bus, ATA 133 bus, etc. (e.g., parallel ATA buses).

As with computer system 100 of FIG. 1, computer system 800 can include additional components in accordance with specific requirements of a given application. Such components include, for example, specialized peripheral buses (e.g., 1394, USB, etc.), network connectivity (e.g., Ethernet, Bluetooth, etc.), and the like.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method comprising:
receiving a plurality of disk I/O command chains and respective start address pointers contemporaneously by re-entrant code from a plurality of threads executing on a processor of a computing system;
storing the plurality of disk I/O command chains, wherein each disk I/O command chain is stored separately from each other without implementing an appending operation;
storing the plurality of respective start address pointers for the plurality of stored disk I/O command chains on a first-in-first-out basis in a buffer of a disk controller for a disk drive using a hardware implemented lock function of the processor and not an operating system lock function to check a fullness of the buffer prior to adding new start address pointers, and using the operating system lock function to handle the buffer after a buffer full condition occurs; and
dynamically accessing and executing the plurality of stored disk I/O command chains by the disk controller by serially accessing on the first-in-first-out basis of the plurality of respective start address pointers in the buffer, wherein the plurality of disk I/O command chains are accessed and executed asynchronously with respect to storing the plurality of disk I/O command chains.

2. The method of claim 1, further comprising:
storing, concurrently with storing the plurality of independent disk I/O command chains, in the buffer, the plurality of respective start address pointers for the independent disk I/O command chains stored in the system memory when the buffer is not full; and
storing, concurrently with storing the plurality of independent disk I/O command chains, in the system memory, the plurality of respective start address pointers for the independent disk I/O command chains stored in the system memory when the buffer is full.

3. A non-transitory computer readable media having computer readable code which when executed by a processor of a computer system cause the computer system to implement a method for dynamic buffering of disk I/O command chains for the computer system, comprising:
receiving the plurality of disk I/O command chains and respective start address pointers contemporaneously by re-entrant code from a plurality of threads executing on the processor of the computing system;
storing the plurality of disk I/O command chains, wherein each disk I/O command chain is stored separately from each other without implementing an appending operation;
storing the plurality of respective start address pointers for the plurality of stored disk I/O command chains on a first-in-first-out basis in a buffer of a disk controller for a disk drive using a hardware implemented lock function of the processor and not an operating system lock function to check a fullness of the buffer prior to adding new start address pointers, and using the operating system lock function to handle the buffer after a buffer full condition occurs; and
dynamically accessing and executing the plurality of stored disk I/O command chains by the disk controller by serially accessing on the first-in-first-out basis of the plurality of respective start address pointers in the buffer, wherein the plurality of disk I/O command chains are accessed and executed asynchronously with respect to storing the plurality of disk I/O command chains.

4. The non-transitory computer readable media of claim 3, wherein, the disk controller accesses the independent disk command chains for execution in accordance with an order of the start address pointers in the buffer.

5. A computer system for dynamic buffering of CPB (command parameter block) chains, comprising:
- a processor;
- a system memory coupled to the processor;
- a bridge component coupled to the processor; and
- a disk controller for a disk drive coupled to the bridge component, wherein the processor execute software code stored in the system memory, the software code causing the computer system to implement a method comprising:
- receiving a plurality of CPB chains and respective start address pointers contemporaneously by re-entrant code from a plurality of threads executing on the processor of the computing system;
- storing the plurality of CPB chains, wherein each CPB chain is stored separately from each other without implementing an appending operation;
- storing the plurality of respective start address pointers for the plurality of stored CPB chains on a first-in-first-out basis in a buffer of the disk controller for the disk drive using a hardware implemented lock function of the processor and not an operating system lock function to check a fullness of the buffer prior to adding new start address pointers, and using the operating system lock function to handle the buffer after a buffer full condition occurs; and
- dynamically accessing and executing the plurality of stored CPB chains by the disk controller by serially accessing on the first-in-first-out basis of the plurality of respective start address pointers in the buffer, wherein the plurality of CPB chains are accessed and executed asynchronously with respect to storing the plurality of CPB chains.

6. The system of claim 5, wherein corresponding CPBs in each chain of CPBs are linked using next CPB pointers.

7. The system of claim 5, wherein the respective start address pointers for the independent CPB chains comprise pointers to first CPBs of the CPB chains.

8. The system of claim 5, wherein the storing of the respective start address pointers for the independent CPB chains in the pointer buffer of the disk controller comprises
- storing the respective start address pointers for the independent CPB chains in the system memory if the pointer buffer is full; and
- incrementally adding the respective start address pointers for the independent CPB chains to the pointer buffer when a portion of the pointer buffer frees up.

* * * * *